US009463545B2

(12) United States Patent
Okita et al.

(10) Patent No.: US 9,463,545 B2
(45) Date of Patent: Oct. 11, 2016

(54) CHATTERING DETECTION METHOD FOR MACHINE TOOL

(75) Inventors: Toshiyuki Okita, Nishio (JP); Ryota Tanase, Ogaki (JP); Shigeru Matsunaga, Anjo (JP)

(73) Assignee: JTEKT CORPORATION, Osaka-shi (JP)

( * ) Notice: Subject to any disclaimer, the term of this patent is extended or adjusted under 35 U.S.C. 154(b) by 601 days.

(21) Appl. No.: 13/408,283

(22) Filed: Feb. 29, 2012

(65) Prior Publication Data

US 2012/0232812 A1 Sep. 13, 2012

(30) Foreign Application Priority Data

Mar. 10, 2011 (JP) ................................ 2011-052460

(51) Int. Cl.
*B23Q 17/09* (2006.01)

(52) U.S. Cl.
CPC ................................ *B23Q 17/0976* (2013.01)

(58) Field of Classification Search
CPC .......... B23Q 17/0976; B23Q 11/0039; B23Q 17/12; B23Q 15/08; G05B 2219/37434; G05B 2219/49054; G05B 2219/41256; G01H 1/003; G01M 13/00; G01M 1/22; G06F 17/00; G05D 19/00
USPC .......................................................... 702/56
See application file for complete search history.

(56) References Cited

U.S. PATENT DOCUMENTS

| 2008/0289923 | A1* | 11/2008 | Suzuki et al. ................. 188/379 |
| 2010/0010662 | A1* | 1/2010 | Inagaki ......................... 700/175 |
| 2010/0104388 | A1* | 4/2010 | Suzuki et al. ................. 409/131 |
| 2011/0291580 | A1* | 12/2011 | Ho et al. ........................ 315/246 |
| 2011/0291850 | A1* | 12/2011 | Sun et al. ....................... 340/683 |
| 2012/0253708 | A1* | 10/2012 | Tanaka ............................. 702/56 |
| 2012/0318062 | A1* | 12/2012 | Tanaka ............................ 73/579 |

FOREIGN PATENT DOCUMENTS

| JP | 2000-210840 | 8/2000 |
| JP | 2000-233368 | 8/2000 |

OTHER PUBLICATIONS

The Extended European Search Report issued Jul. 16, 2012, in Application No. / Patent No. 12158530.1-2302.
Office Action issued on Apr. 30, 2013 in the counterpart European Patent Application No. 12 158 530.1.

\* cited by examiner

*Primary Examiner* — Mohamed Charioui
*Assistant Examiner* — Catherine Rastovski
(74) *Attorney, Agent, or Firm* — Oblon, McClelland, Maier & Neustadt, L.L.P.

(57) ABSTRACT

Reference phase variation values σk1 to σKn, each of which is a variation among a plurality of phases that occur during non-machining and phase variation values σ1 to σn, each of which is a variation among a plurality of phases that occur during machining are detected from measured vibration with the use of a chattering detector that is used to calculate phases of a desired number (n) of frequencies. If σKi−σi is smaller than a determination value TK, it is determined that chattering having a frequency i is occurring.

2 Claims, 6 Drawing Sheets

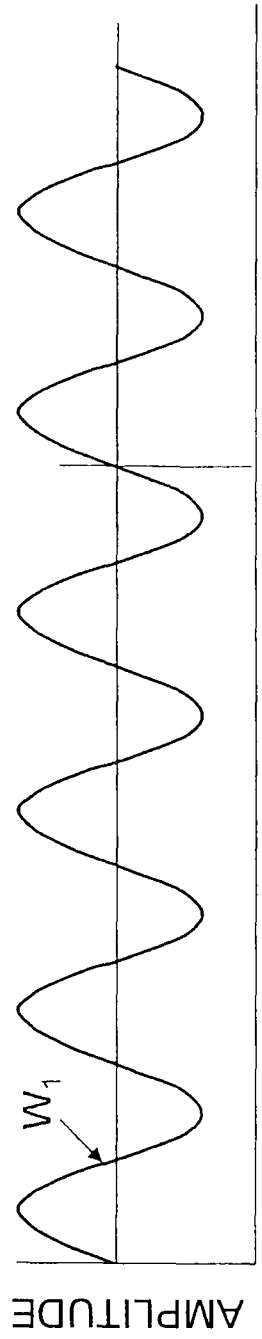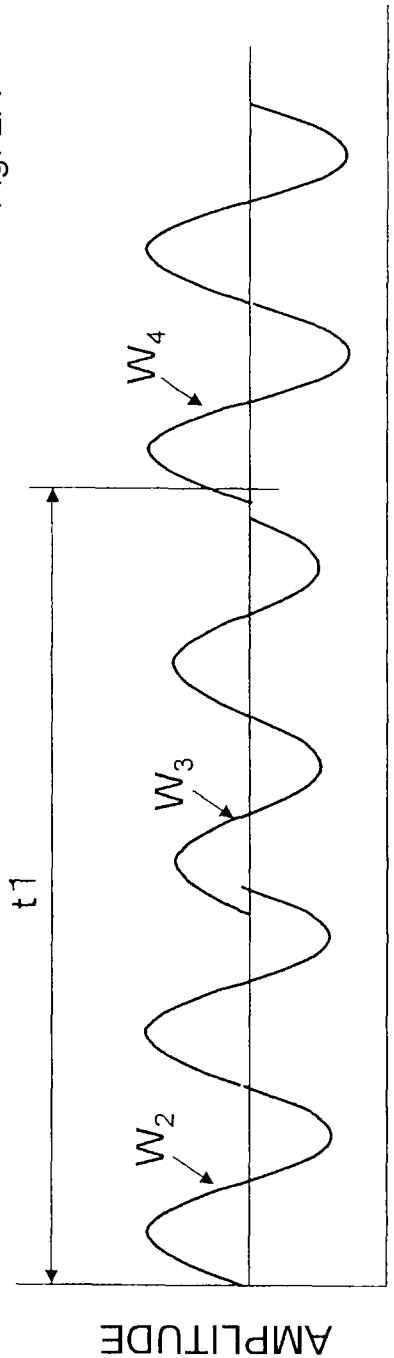

CHATTERING DETECTION METHOD FOR MACHINE TOOL

INCORPORATION BY REFERENCE/RELATED APPLICATION

This application claims priority to Japanese Patent Application No. 2011-052460 filed on Mar. 10, 2011 the disclosure of which, including the specification, drawings and abstract, is incorporated herein by reference in its entirety.

BACKGROUND OF THE INVENTION

1. Field of the Invention

The invention relates to a method for detecting chattering that occurs when a workpiece is machined by a machine tool.

2. Discussion of Background

In order to suppress chattering, it is important to detect occurrence of chattering and its frequency. Japanese Patent Application Publication No. 2000-210840 describes a chattering detection method in which whether chattering is occurring is determined based on a frequency of a vibration. Japanese Application Publication No. 2000-233368 describes determining whether chattering is occurring based on the level of a vibration and the degree of a change in the vibration over a given period of time.

According to Japanese Patent Application Publication No. 2000-210840, chattering is detected through comparison between a reference vibration frequency, which is set and stored in advance, and a chattering frequency. However, a chattering frequency varies depending upon combinations of various tools and workpieces. Therefore, if chattering having an unpredictable frequency occurs, the chattering may not be detected.

According to Japanese Patent Application Publication No. 2000-233368, chattering is detected based on the level of a vibration and the degree of a change in the vibration over a given period of time. However, a vibration level varies depending upon the machining conditions and the state of a cutting edge of a tool. Therefore, chattering vibration detection may not be stably performed.

SUMMARY OF THE INVENTION

In light of the above-described circumstances, the invention has been made to provide a chattering detection method that allows reliable detection of chattering.

According to a feature of an example embodiment of the invention, it is possible to determine whether a vibration is chattering, based on the phase difference of multiple vibrations.

According to another feature of an example of the invention, chattering is accurately detected in a short period of time by calculating a precise phase difference in a short period of time, by utilizing the difference between the time at which to perform a measurement in a first step and the time at which to perform a measurement in a second step.

According to a further feature of an example of the invention, chattering attributed to machining is accurately detected by examining the level of a vibration that occurs during machining, with reference to the level of a vibration that occurs in a state where a workpiece or a tool is rotating but the workpiece is not being machined.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein

FIG. 2A is a chart conceptually illustrating a continuous vibration;

FIG. 2B is a chart conceptually illustrating a non-continuous vibration;

DETAILED DESCRIPTION OF EMBODIMENTS

Hereinafter, an example embodiment of the invention will be described with reference to the accompanying drawings.

Figure 1:
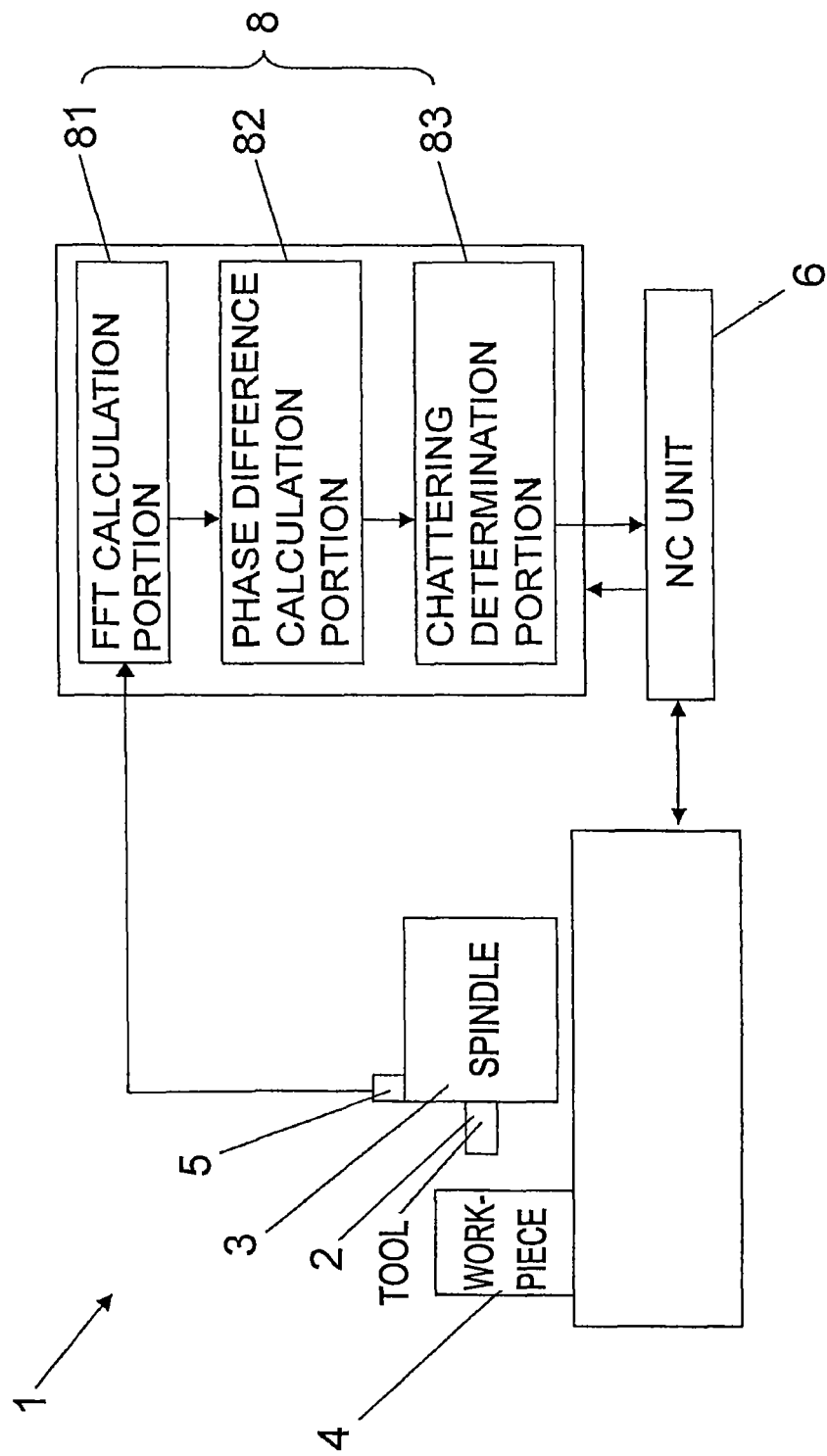
FIG. 1 is an overall view schematically showing a machine tool and a chattering detector.

As shown in FIG. 1, in a machine tool 1, a spindle 3 that rotates and holds a tool 2 and a workpiece 4 are moved relative to each other to perform desired machining. The operations of the spindle 3, such as rotation and feeding, are controlled by an NC (Numerical Control) unit 6. The spindle 3 is provided with a vibration sensor that detects vibrations. Outputs from the vibration sensor 5 are input into a chattering detection unit 8. The chattering detection unit 8 includes a FFT (Fast Fourier Transform) calculation portion 81 that executes a Fourier analysis, a phase difference calculation portion 82 that calculates a phase difference, and a chattering determination portion 83 that determines whether chattering is occurring and outputs this determination to the NC init 6 to control the spindle.

In the following, a method for detecting chattering will be described. First, the characteristics of vibrations that occur during machining will be described with reference to an example case where a rotary tool is used for the machining, using the conceptual views in FIG. 2A and FIG. 2B.

Vibrations having various frequencies concurrently occur during machining. Even among vibrations having the same frequency, some are continuous while the others are non-continuous. Whether a vibration is continuous or non-continuous depends upon the cause of the vibration. FIG. 2A illustrates a vibration $W_1$ that is continuous, while FIG. 2B illustrates a non-continuous vibration composed of vibrations $W_2$, $W_3$, and $W_4$ that occur intermittently. If the cause of a vibration is continuous, the vibration is also continuous. On the other hand, if the cause of a vibration is non-continuous, the vibration is also non-continuous, and its amplitude is not constant. Examples of such "continuous vibration" include a vibration due to imbalance of a rotary tool, a vibration attributed to the number of balls or rollers of a bearing used in a spindle, a vibration corresponding to the cycle of cutting edges that depends on the number of the cutting edges and the rotation speed of the tool, and regenerative chattering. On the other hand, examples of "non-continuous vibration" include a vibration due to variation in the hardness of a workpiece, a vibration due to a change in supply of coolant, a vibration due to a change in stock removal, and a vibration due to external disturbance. It is highly likely that chattering is a vibration that is grouped into "continuous vibration" but that is other than vibrations that occur when the tool 2 is rotating but the workpiece 4 is not being machined.

Figure 3:
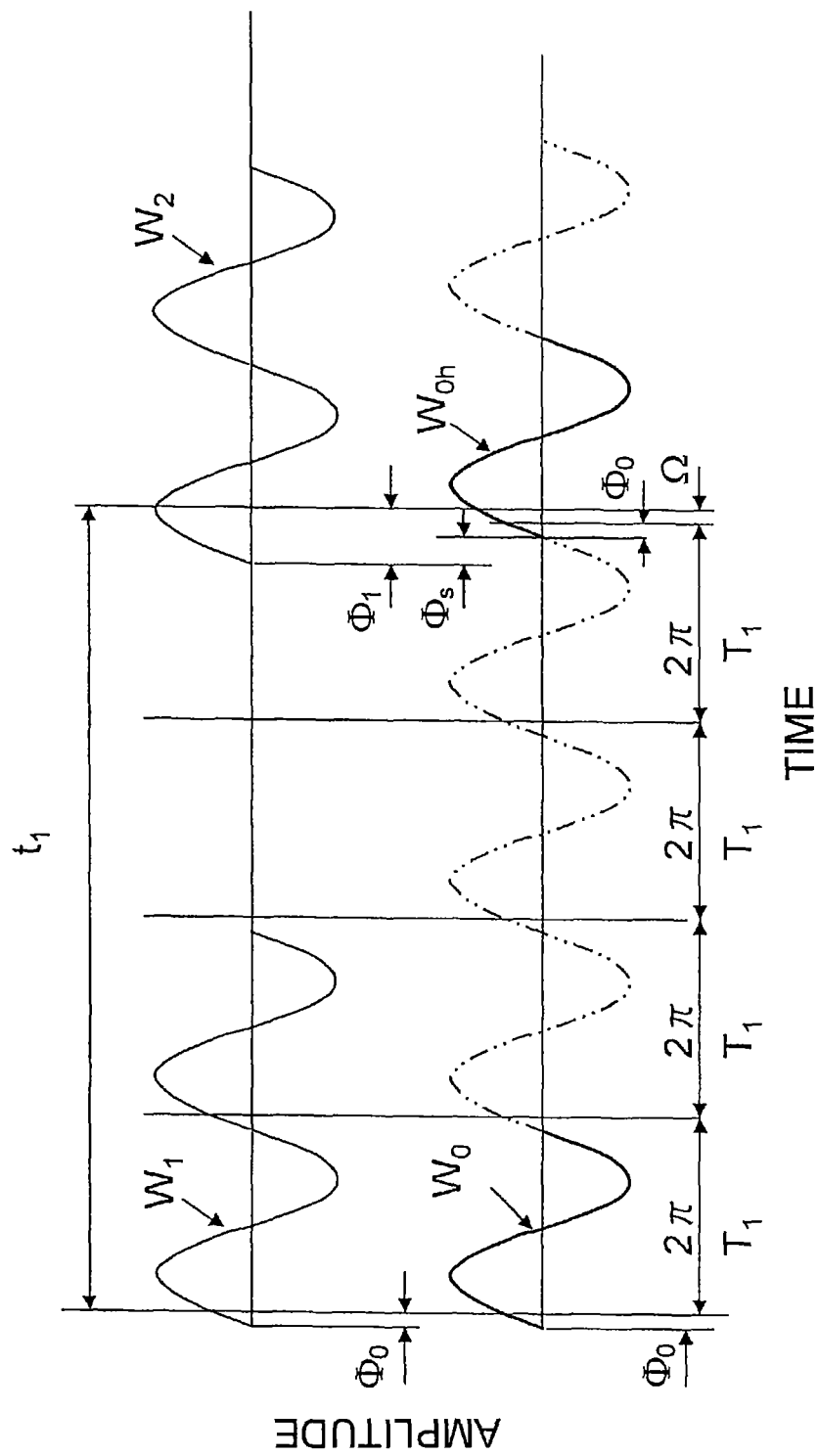
FIG. 3 is a chart conceptually illustrating a phase difference calculation.

A method of determining whether a vibration is a continuous vibration will be described with reference to FIGS. 2A, 2B and FIG. 3.

In the case of the continuous vibration $W_1$ illustrated in FIG. 2A, if the phase of the vibration at the time of starting a vibration measurement is identified, it is possible to estimate the phase that will be achieved after time $t_1$ based on the vibration cycle. The phase thus estimated coincides with the phase actually measured after time $t_1$. However, in the case of the non-continuous vibration illustrated in FIG. 2B, vibrations $W_2$ and $W_4$ are independent from each other and are not associated with each other. Therefore, it is highly likely that the phase after time $t_1$, which is estimated based on the phase of the vibration $W_2$ at the time of starting a vibration measurement, differs from the phase of the vibration $W_4$, which is actually measured after time $t_1$. Therefore, whether a vibration is a continuous vibration is determined based on the characteristics described above.

In the following, an example method for determining whether a vibration is a continuous vibration based on the above-described characteristics will be described in detail with reference to FIG. 3. In the example case illustrated in FIG. 3, the phase of the vibration $W_1$ at the time of starting a measurement is denoted by $\Phi_0$, the phase of the vibration measured after time $t_1$ is denoted by $\Phi_1$, and the vibration cycle is denoted by $T_1$. If the phase difference is represented by a value equal to or smaller than $2\pi$, the phase of a continuous vibration after time $t_1$ is $\Phi_0+\Omega$, and $\Omega$ is a value obtained by multiplying $2\pi$ by the decimal part of $(t_1/T_1)$. If the phase $\Phi_1$ of the vibration that is measured after time $t_1$ is equal to $\Phi_0+\Omega$, the vibration is determined to be a continuous vibration. On the other hand, if there is a predetermined difference (Ds between the phase $\Phi_1$ of the vibration that is measured after time $t_1$ and $\Phi_0+\Omega$, the vibration is determined to be a non-continuous vibration.

Figure 4:
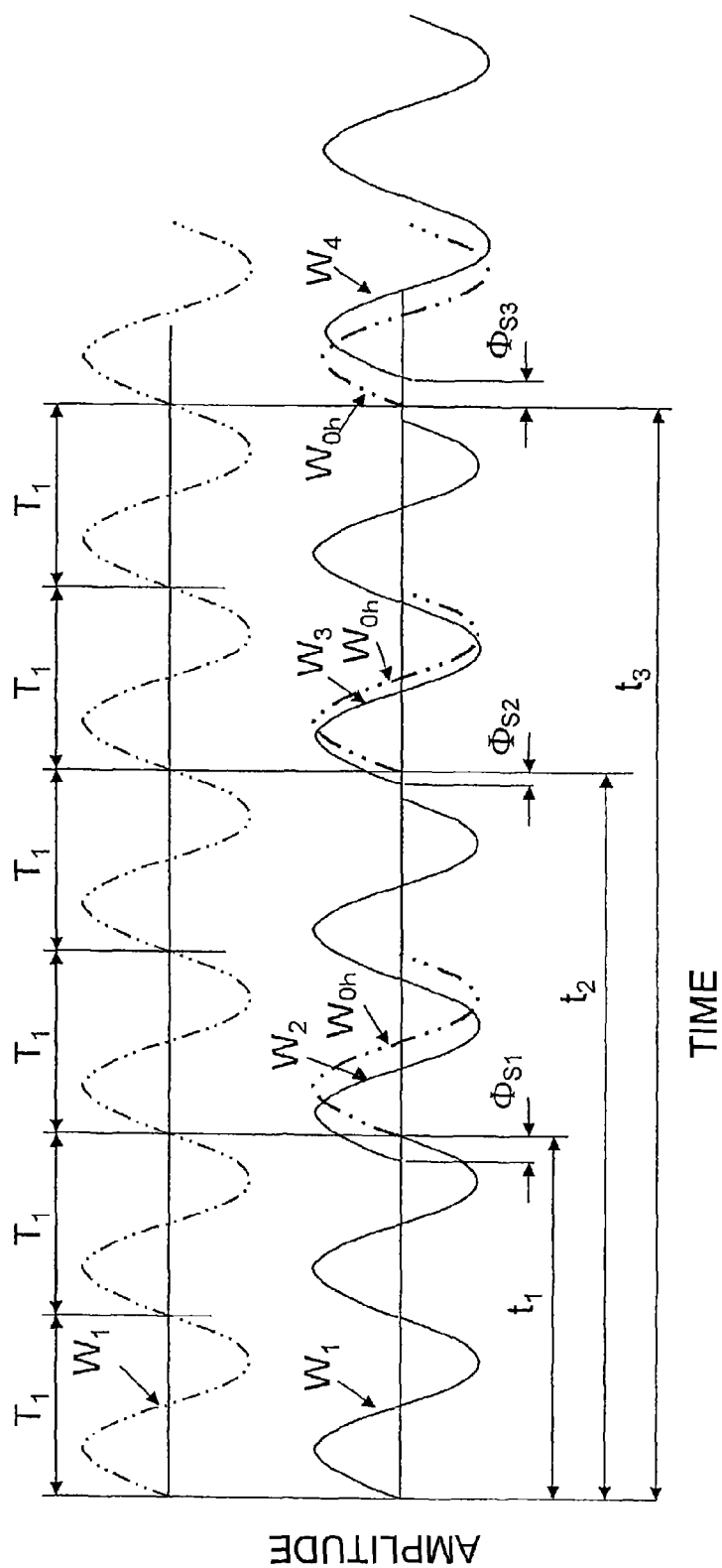
FIG. 4 a chart conceptually illustrating a phase difference variation.

If the measurement is performed only once, the difference between $\Phi_0+\Omega$ and $\Phi_1$ may happen to be small. In such a case, there is a possibility of an erroneous determination. Therefore, as shown in FIG. 4, the vibrations $W_2$, $W_3$, and $W_4$ are individually measured at different time points, that is, at time $t_1$, time $t_2$, and time $t_3$. Then, the phases of the measured vibrations $W_2$, $W_3$, and $W_4$ are compared with the phases of a waveform $W_{oh}$ predicted based on the initially measured phase to determine a phase difference $\Phi_{S1}$ at time $t_1$, a phase difference $\Phi_{S2}$ at time $t_2$, and a phase difference $\Phi_{S3}$ at time $t_3$. Then, the phases differences $\Phi_{S1}$ to $\Phi_{S3}$ are compared with each other. In this way, it is possible to prevent an error due to an accidental coincidence, thus achieving an improved reliability of the chattering detection. More specifically, in this determination method, the value of variation among the multiple phases differences $\Phi_{S1}$ to $\Phi_{S3}$ is calculated. If the value of the variation is smaller than a reference value, the vibrations $W_2$, $W_3$, and $W_4$ are determined to be a continuous vibration. On the other hand, if the value of the variation is equal to or larger than the reference value, the vibrations $W_2$, $W_3$, and $W_4$ are determined to be a non-continuous vibration. The value of variation is, for example, a standard deviation $\sigma$.

It is to be noted that in the example case illustrated in FIG. 4, the times $t_1$, $t_2$, and $t_3$ are set to integral multiples of the vibration cycle $T_1$ for easier comprehension.

The actual measurement is performed on a vibration with combined frequencies. Therefore, the phases of the vibration in a time domain are calculated for respective frequencies through a Fourier analysis, which makes it possible to determine the phases of the vibration for the frequencies in a desired range.

Chattering occurs during machining. Therefore, whether chattering is occurring is reliably determined according to the following method. The machine tool 1 is operated in the same manner as that when it is operated for machining, but without performing actual machining (so called "dry run" is performed). The vibration phase variations for respective frequencies, during dry run, are recorded, and compared with the vibration phase variations during actual machining. If there is a frequency for which the difference between the variation during machining and the variation during non-machining is larger than a predetermined value, it is determined that chattering having this frequency is occurring.

In the following, a procedure for detecting chattering will be described with reference to the flowcharts in FIGS. 5 and 6.

Figure 5:
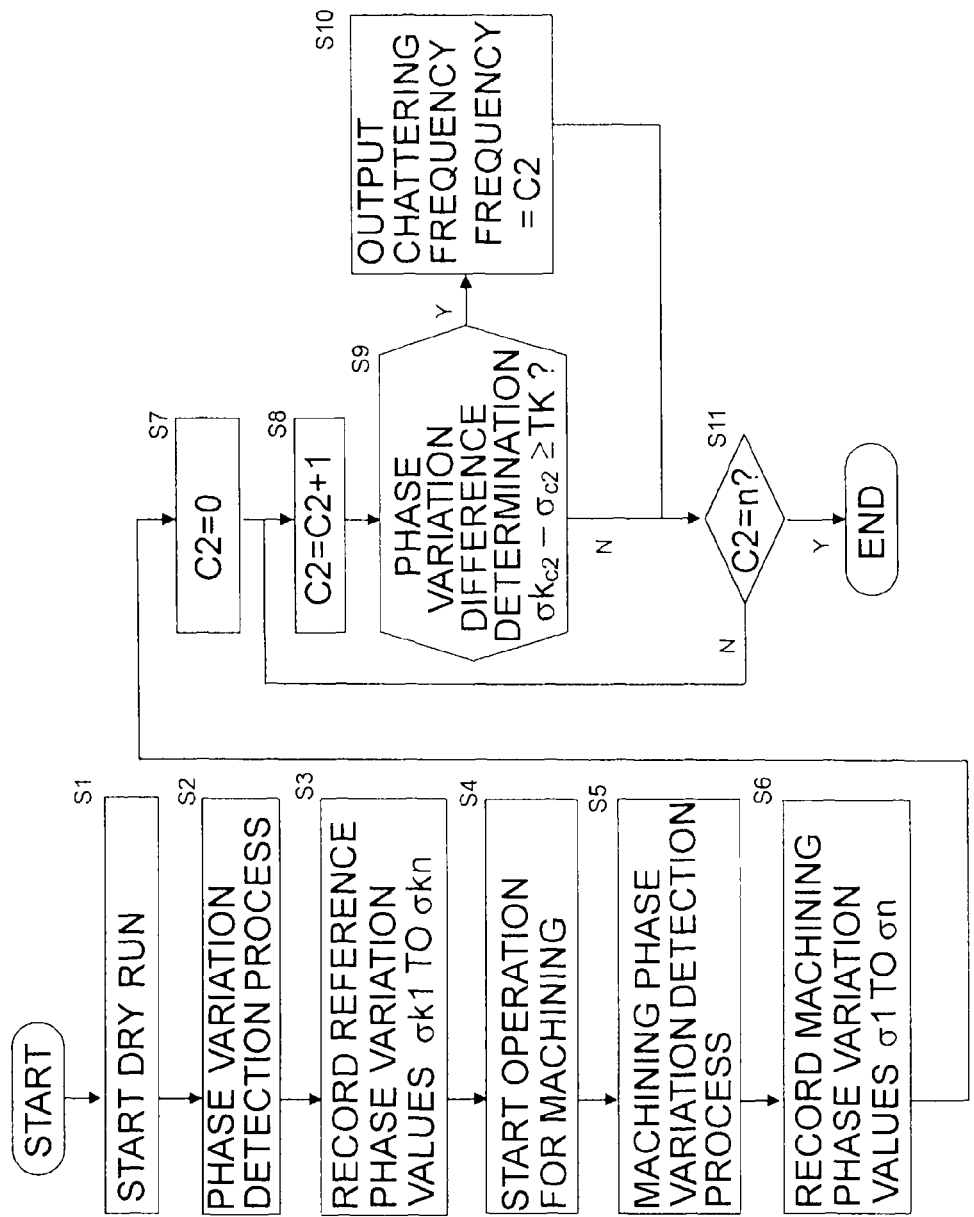
FIG. 5 is a flowchart illustrating the overall procedure of a chattering detection method.

The flowchart in FIG. 5 illustrates the whole procedure of a chattering detection method in which whether chattering is occurring is determined by making the above-described comparison between the phase variations during non-machining and the phase variations during machining, for n vibrations having, respectively, frequencies 1 to n.

In this chattering detection method, first, so-called "dry run", in which the same operation as that during actually machining but machining of a workpiece using the tool is not performed, is started (step S1). After this, a phase variation detection process, which will be described in detail with reference to the flowchart in FIG. 6, is executed (step S2). The standard deviations of the phase variations calculated in the phase variation detection process (step S2) are recorded as reference phase variations ($\sigma k_1$ to $\sigma k_n$) (step S3). Then, the machining operation is started (step S4). Then, a machining phase variation detection process for detecting the phase variations during machining is executed (step S5). The phase variations during machining, which are calculated in the machining phase variation detection process (step S5), are recorded as machining phase variation values ($\sigma_1$ to $\sigma_n$) (step S6). After this, a value of a counter C2 is set to zero (step S7). Then, the counter C2 is incremented by 1 (step S8). Subsequently, with regard to the frequency C2, whether the phase variation difference is equal to or larger than a permissible value TK ($\sigma k_{C2}-\sigma_{C2} \geq TK$ ?) is determined (step S9). At this time, if the phase variation deference is equal to or larger than the permissible value TK ($\sigma k_{C2}-\sigma_{C2} \geq TK$), the control proceeds to step 10 and a signal indicating that chattering having the frequency C2 is occurring is output (S10). On the other hand, if the phase variation deference is smaller than the permissible value TK ($\sigma k_{C2}-\sigma_{C2} < TK$), the control proceeds to step S11. Then, it is determined whether the above-described frequency determination processes have been completed for all of the n frequencies (step S11). That is, if C2 is equal to n (C2=n), the procedure is finished. On the other hand, if C2 is not equal to n, the control returns to step S8.

Figure 6:
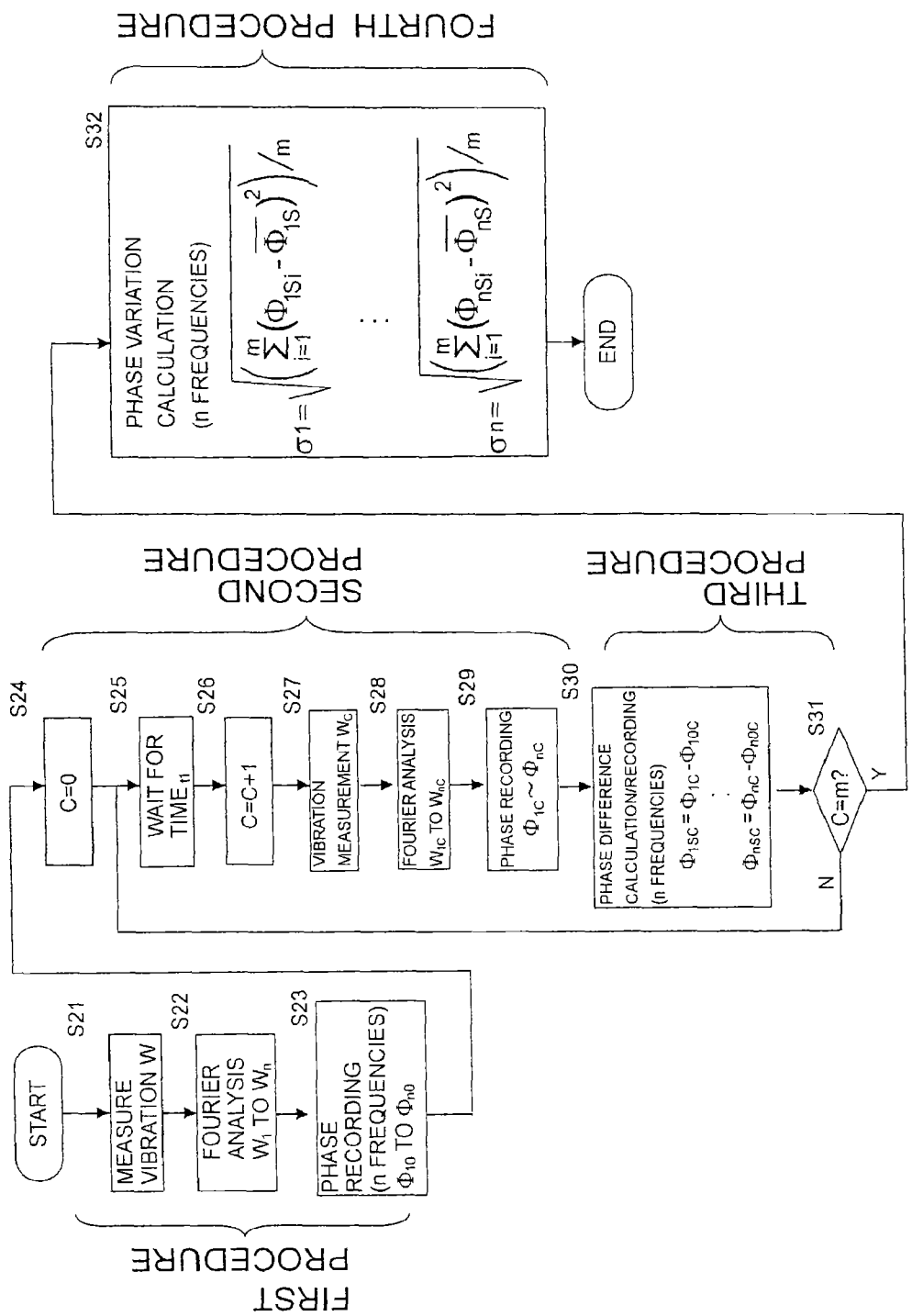
FIG. 6 is a flowchart illustrating the procedure of phase variation detection.

The flowchart in FIG. 6 illustrates the flow of the phase variation detection process, which is executed in step S2 in FIG. 5 in the procedure described above. In the phase variation detection process, the standard deviations $\sigma$, which are values of the phase variations of vibrations having frequencies in a desired frequency range, are calculated using the data obtained by repeating measurements through the second procedure and the third procedure for m times after executing the first procedure.

As shown in FIG. 6, first, a vibration is measured by a vibration measurement sensor (step S21). Then, a desired number (n) of frequencies and the phases of the respective frequencies are calculated through a Fourier analysis (step S22). After this, the phases corresponding, respectively, to the n frequencies are recorded as $\Phi_{10}$ to $\Phi_{n0}$ (step S23). Then, the value of a counter C is set to zero (step S24). Then, a standby state is continued for a predetermined standby time $t_1$ (step S25). After this, the counter C is incremented by 1 (step S26). Then, a vibration is measured by the vibration measurement sensor (step S27). Then, n frequencies and the phases of the respective frequencies are calculated through a Fourier analysis (step S28). After this, the phases corresponding, respectively, to the n frequencies are recorded as the Cth data (step S29). Then, phase differences $\Phi_{1SC}$ to $\Phi_{nSC}$ corresponding, respectively, to the n frequencies are calculated and recorded. More specifically, the difference between the phase of a waveform obtained by extending, by $C \cdot t_1/T_1$, the single-wavelength waveform having the phase $\Phi_0$ recorded in the first procedure in the direction of the time axis and the phase $\Phi_C$ measured/calculated in the second procedure is calculated for each of the n frequencies (step S30). Then, whether the measurement has been performed for a predeterminded number of times is determined. More specifically, whether C is equal to m is determined (step S31). If C is not equal to m, the control returns to step 25. On the other hand, if C is equal to m, the measurement is finished, and then the control proceeds to step S32. After this, the standard deviations $\sigma_1$ to $\sigma_n$ of the phase difference variations are calculated based on m phase difference data obtained for each of the n frequencies (step S32).

According to the above-described chattering detection method in the example embodiment of the invention, the respective differences between the standard deviations $\sigma k_1$ to $\sigma k_1$ of the phase variations detected during dry run and the standard deviations $\sigma_1$ to $\sigma_n$ of the phase variations detected during machining are calculated for the vibration with frequencies in a desired range. If there is a frequency for which the above calculated difference is smaller than the permissible value TK, which is a predetermined value, it is determined that chattering having this frequency is occurring. In this way, a vibration that is continuous only during machining is determined as chattering. Further, whether chattering is occurring is determined using the multiple phase differences. Accordingly, even chattering of which the vibration level is still low is detected, and therefore the accuracy of the chattering detection is high, as compared to conventional chartering detection methods in which chattering is detected based on the vibration level(s).

In the embodiment described above, whether chattering is occurring is determined based on the differences between the phases obtained by extending the phases measured in the first procedure in FIG. 6 in the time axis direction by $2\pi \cdot t_1/T_1$ and the phases measured in the second procedure. However, in a case where chattering having a specific frequency is to be detected (determined), if the vibration cycle of the specific frequency is $T_K$, the measurement may be performed on the condition that $t_1 = n \cdot T_K$ (n is an integer), and whether chattering is occurring is determined using the respective differences between the phases measured in the first procedure and the phases measured in the second procedure.

Further, while vibrations are detected by the vibration sensor provided at the spindle that rotates the tool in the foregoing example embodiment, the vibration sensor may be provided on the workpiece side. Further, a sound sensor, such as a microphone, may be used in place of the vibration sensor. In this case, the sound waves caused by vibrations are measured using the sound sensor. In this case, the restriction on the measurement point is reduced.

While whether chattering is occurring is determined through a comparison between the phase variations during non-machining (dry-run) and the phase variations during machining in the foregoing example embodiment, the degree of a change in the phase variation during machining may be monitored, and it may be determined that chattering is occurring when a predetermined change is detected in the phase variation during machining.

While the minimum value of the determination frequency is 1 Hz and the interval of the determination frequency is 1 Hz in the foregoing example embodiment, the range and interval of the determination frequency may be set as needed. That is, for example, the range of the determination frequency may be set within the range of 20 to 2000 Hz or so and the interval of the determination frequency may be approximately 5 Hz.

What is claimed is:

1. A machining method comprising:
    machining a workpiece by a tool mounted to a spindle;
    controlling the tool by a control unit;
    determining occurrence of chattering when the workpiece is machined by the tool and controlled by the control unit, wherein the step of determining occurrence of chattering comprises determining that chattering is occurring if a difference between a first phase variation value of a vibration of the tool calculated in a first phase variation detection process and a second phase variation value of a vibration of the tool calculated in a second phase variation detection process is equal to or larger than a predetermined value, wherein the first phase variation detection process is executed when the workpiece or the tool is rotating but the workpiece is not being machined, and the second phase variation detection process is executed when the workpiece is being machined by the tool,
    wherein the first phase variation detection process and the second phase variation detection process each include:
        a first step of measuring a vibration of the tool and calculating a phase of a vibration waveform of at least one frequency in a predetermined frequency range by executing a Fourier analysis on the vibration waveform in a time domain;
        a second step of measuring a vibration of the tool at a predetermined time after the first step and calculating a phase of the vibration waveform of at least one frequency measured in the second step in the predetermined frequency range by executing a Fourier analysis on the vibration waveform measured in the second step in a time domain;
        a third step of calculating a phase difference between the phase of the vibration waveform of the tool calculated in the first step, which has a predetermined frequency or have predetermined frequencies, and the phase of the vibration waveform of at least one frequency of the tool calculated in the second step, which has the predetermined frequency or have predetermined frequencies; and
        a fourth step of calculating a variation among multiple phase differences that are calculated by repeating the second step and the third step for a predetermined number of times; and
    controlling the tool to suppress chattering when it is determined in the step of determining occurrence of chattering that chattering is occurring,
    wherein the first step calculates the phase of a vibration waveform of one of a continuous waveform and a non-continuous waveform, and the second step calculates the phase of a vibration waveform of the other one of the continuous waveform and the non-continuous waveform.

2. The machining method according to claim 1, wherein in the third step, the phase difference is calculated between the phase of the vibration waveform of at least one frequency calculated in the second step and a phase of a vibration waveform which is predicted by extending in a direction of a time axis the vibration waveform of the frequency at which the phase is calculated in the first step, and wherein the phase of the predicted vibration waveform at a time point when the measurement of the vibration of the tool is started in the second step.

\* \* \* \* \*